Oct. 8, 1929.    L. J. SAUER ET AL    1,730,630
BALL BEARING
Filed Dec. 17, 1926
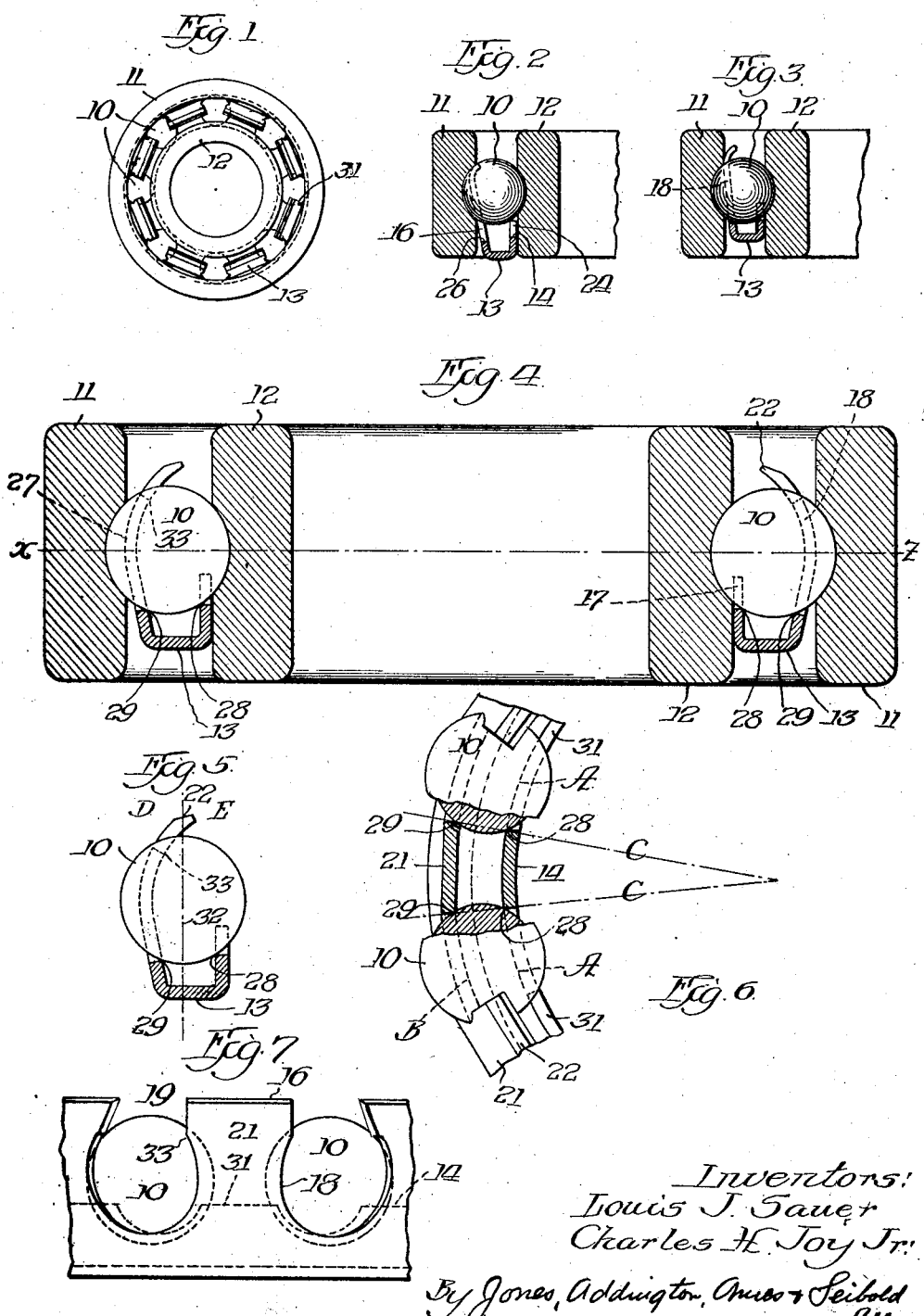
Inventors:
Louis J. Sauer
Charles H. Joy Jr.
By Jones, Addington, Ames & Seibold
Attys Patented Oct. 8, 1929

1,730,630

UNITED STATES PATENT OFFICE

LOUIS J. SAUER, OF OAK PARK, AND CHARLES H. JOY, JR., OF CHICAGO, ILLINOIS, ASSIGNORS TO CHARLES H. JOY, SR., OF CHICAGO, ILLINOIS

BALL BEARING

Application filed December 17, 1926. Serial No. 155,363.

Our invention relates to ball bearings and particularly to ball bearings of the radial or concentric type wherein the balls are spaced between the ball races by a cage or retaining member.

Our invention also relates to the method of constructing the ball bearing described and claimed herein.

In the manufacture and use of ball bearings considerable difficulty has been encountered by the vibration or chattering of the balls in the ball races and while in many instances cages or retaining members have been employed for maintaining the required distance between the individual balls, these devices have been to a greater or a less degree unsatisfactory. While the former types of retaining members undoubtedly have a tendency to decrease the vibrations and relative movement of the adjacent balls, no construction has ever come into general use which will entirely eliminate the vibrations and consequent destruction of the retainers.

The object of our invention is to provide a cheap and simple retainer which will eliminate the objections above noted which said objections have resulted in the destruction of the ball-retaining member in most cases after a short period of use. Our invention consists in providing the balls with a channel seat and upwardly extending fingers which, when forced into place, align the balls in the ball races and closely embrace them without permitting any side play thereof so that there can be no vibrations set up between the balls and ball-retaining members.

Another object of the invention is to provide a ball retainer which has its fingers so constructed that it can be forced into position after the balls have been placed in the ball races.

Further objects and advantages of this invention will be readily understood by those skilled in the art to which this invention appertains, from the following description, when considered in connection with the accompanying drawings, in which Figure 1 is a side view of a radial ball bearing embodying our invention;

Fig. 2 is a cross-sectional view on line 2—2 of Fig. 1 and shows the first step in the insertion of the ball-retaining member;

Fig. 3 is a like view showing the ball-retaining member in an advanced position;

Fig. 4 is a greatly enlarged cross-sectional view taken on the line 4—4 of Fig. 1 and shows the retaining member in its final and operative position;

Fig. 5 is a side view of a ball showing the relative position of the ball-retaining member;

Fig. 6 is a fragmentary plan view of the ball-retainer with a portion in section to show the impinging points of the flanges of the retainer substantially as shown in Figs. 4 and 5; and Fig. 7 is a fragmentary edge view of the retainer and balls.

In the several figures of the drawing, like reference characters indicate like parts.

Referring more particularly to the drawing, the radial ball bearing shown therein comprises a set of balls 10 disposed in annular grooves in the inner and outer ball race members 11 and 12 and the ball-retaining member 13 which holds the balls in proper spaced relation between said race members. The balls and ball race members are of the usual construction and our invention relates to and is concerned only with the retaining or maintaining member 13 and the method of placing the same in position between the ball races.

This ball-retaining member 13 is formed of a single piece of sheet metal stamped and pressed to shape and comprises a circular ring or annulus having an inner flange 14 and an outer flange 16. The inner flange 14 is of shallow depth and is provided with a series of equally spaced recesses 17 which are made to conform with that portion of the periphery of the ball into which they come into contact when the retaining member is in position, while the flange 16 is much deeper than the flange 14 and is provided with recesses 18 which are also designed to conform to that part of the periphery of the ball with which they come in contact, and these latter recesses terminate in slotted portions 19 so as to provide fingers 21 between the same. These fingers are preferably chamfered at their outer edges, as shown at 22. Assuming the line X—Z in Fig. 4 to represent the medial plane of the balls, the fingers 31 of the flange 14 are short and sturdy and extend a distance short of the axial center of the balls so as to embrace the same on one side of said medial plane only, while the fingers 21 of the flange 16 are considerably greater in length and extend beyond the axial center of the balls and embrace them on both sides of said medial plane. It may be stated that the recesses 17 in the flange 14 are less than a semi-circle while those in the flange 16 are greater than a semi-circle. This is only approximate as the recesses would not be truly circular, but figuratively speaking this will describe the manner in which the fingers embrace the balls.

The method of assembling the ball bearing is as follows: The balls are placed in one side of the annular groove of the outer ball race 11 and lie in close proximity, when the inner ball race 12 may be passed over the same and into position, whereupon the balls may be evenly distributed in the aligned recesses. The cage or retaining member 13 is now pressed into position so that one of the fingers 21 extends between each of the balls 10 and the first step of this method is shown in Fig. 2. The outer chamfered end 22 of the fingers must extend into the annular grooves of the outer ball race in order that the wide ends of the fingers may pass the balls and as the retainer is further pressed into position, as shown in Fig. 3, the outer ends of the fingers will emerge from the annular groove, and the points 24 and 26 in the bottom of the recesses 17 and 18 in the flange members 14 and 16, respectively, will engage the periphery of the ball on opposite sides but not evenly spaced from the radial center line of said balls. By extending the long fingers into the race-way to pass the balls the greatest width of finger tips can be utilized. This will make the fingers sturdy and give more confining space in the recesses. The fingers 21 are now bent over into the position shown in Fig. 4 which produces a humped portion 27 thereon and as the recess 18 has been perfectly designed all points of metal surrounding this recess will engage the periphery of the ball so as to take up all play between the same and the recesses 17 in the flange 14.

The points 28 in the bottom of the recess 17 will strike the balls along the circumferential line A shown in Figure 6, while the point 29 in the bottom of the recesses 18 of the flanges 16 will strike the balls along the circumferential line B, also shown in Fig. 6. These points of contact A and B will be intersected by radial lines C—C, while the close engagement of the fingers 21 with the periphery of the ball, aided by the short fingers 31 of the inner flange, will positively prevent the balls from crowding the fingers and crumpling or otherwise distorting the same. This is one of the greatest difficulties to be overcome in the formation of ball retainers and even pressure along the fingers of the retainer must be at all times maintained if the ball is to ride smoothly within the ball race and between the fingers of the member.

With this design of ball bearing the vibrations and chattering, usually apparent in most bearings of this type, are entirely eliminated by reason of the fingers 18 having the recesses 16 therein conforming to the periphery of the ball which they engage and are designed to contact and hold the balls therebetween and the contact points 28 and 29.

It will be noted that the points of contact 28 and 29 fall on opposite sides of the radial center 32 of the balls so that these points of contact, together with the points 33 on the fingers 21 which fall within the vertical points of contact 28 and 29, will add to the rigidity of the construction and give an aligned contacting nest in which the ball operates so as to insure stability in the construction. In some cases it may be considered advisable to bend the long fingers completely over against the ball so that they embrace the balls throughout their length.

It will be apparent to those skilled in the art that if the vibratory and chattering objections can be eliminated, the fingers and, in fact, the entire retaining member, will outwear any of the ordinary retaining members in which these objections are present, as the vibrations tend to shatter or break the retaining member. The confining relation between the points of contact 28, 29 and 33 positively prevent any vibration between the balls and retaining member and thus insure a non-vibratory retaining member.

While we have disclosed a preferred form of our improved ball bearing and method of making the same, it will be apparent to those skilled in the art that various modifications and changes in the design and method of constructing the ball bearing may be resorted to without departing from the spirit of the invention or sacrificing any of its advantages. This application, therefore, contemplates all variations, modifications and mechanical equivalents as may properly fall within the spirit and purview of the appended claim.

We claim:

A radial ball bearing construction comprising inner and outer ball race members, a set of balls in said ball race members, and a ball retainer for positioning the balls, the medial planes of the raceways in the inner and outer ball race members being substantially co-incident, said ball retainer comprising a formed sheet metal member comprising a main annular portion lying in the space between the inner and outer ball race members and to one side of and spaced from the set of balls, and comprising also two annular ball positioning flanges, the outer flange extending from said main annular portion substantially beyond the medial plane of the balls and having curved perforations the edges of which snugly engage said balls and have substantially more than 180° contact with the balls, substantially 180° of said edge contact being on one side of the medial plane of the ball races, and the inner flange having curved perforations, the edges of which snugly engage the balls and have not more than 180° contact with the balls, all of said edge contact being on one side of said medial plane, said flanges being disposed at such distances from the cylindrical surfaces in which the centers of the balls lie that lines C—C in a plane perpendicular to the axis of the ball bearing and drawn through the points of contact of the flanges with the balls will intersect each other at said axis, whereby the tendency of the balls to crowd the inner flange inwardly is exactly counterbalanced by the tendency of the balls to crowd the outer flange outwardly.

In witness whereof we have hereunto subscribed our names.

LOUIS J. SAUER.
CHARLES H. JOY, Jr.